United States Patent [19]

Persson

[11] 4,208,971
[45] Jun. 24, 1980

[54] LOADING PALLET

[76] Inventor: Nils G. W. Persson, 19 Anders väg, Ljungsbro, Sweden, S-590 60

[21] Appl. No.: 926,150

[22] Filed: Jul. 19, 1978

Related U.S. Application Data

[63] Continuation of Ser. No. 773,154, Mar. 1, 1977.

[30] Foreign Application Priority Data

Mar. 2, 1976 [SE] Sweden ............................... 7602952

[51] Int. Cl.² .......................................... B65D 19/34
[52] U.S. Cl. .................................. 108/51.1; 248/188; 403/263; 403/332
[58] Field of Search ................. 108/51.1, 51.3, 53.1, 108/56.1, 56.3, 57.1; 206/386, 599, 600; 217/43 A; 214/10.5 R; 248/188; 403/244, 263, 332

[56] References Cited

U.S. PATENT DOCUMENTS

| 2,106,148 | 1/1938 | Kellner | 403/332 X |
|---|---|---|---|
| 2,444,184 | 6/1948 | Cahners | 108/51.1 |
| 3,036,672 | 5/1962 | Kohl | 108/57.1 X |
| 3,277,847 | 10/1966 | Jensen | 108/56.1 |
| 3,407,758 | 10/1968 | Simkins | 108/51.3 |
| 3,610,173 | 10/1971 | McIlwraith et al. | 108/57.1 X |

FOREIGN PATENT DOCUMENTS

| 2261192 | 9/1975 | France | 108/53.1 |
|---|---|---|---|
| 1249639 | 10/1971 | United Kingdom | 108/56.3 |

Primary Examiner—William E. Lyddane
Attorney, Agent, or Firm—Allegretti, Newitt, Witcoff & McAndrews

[57] ABSTRACT

A throw-away loading pallet made from fibre board and having cardboard tubular supports serving as feet, the supports being interconnected by fibre board strips to strengthen them. The tubular supports at one end are secured to the pallet and at their opposite end to the connecting strips by sinking their ends in blind annular openings, with all contact surfaces being glued. The result is a light-weight cheap pallet of unusual strength, which can be recycled as waste pulp.

2 Claims, 7 Drawing Figures

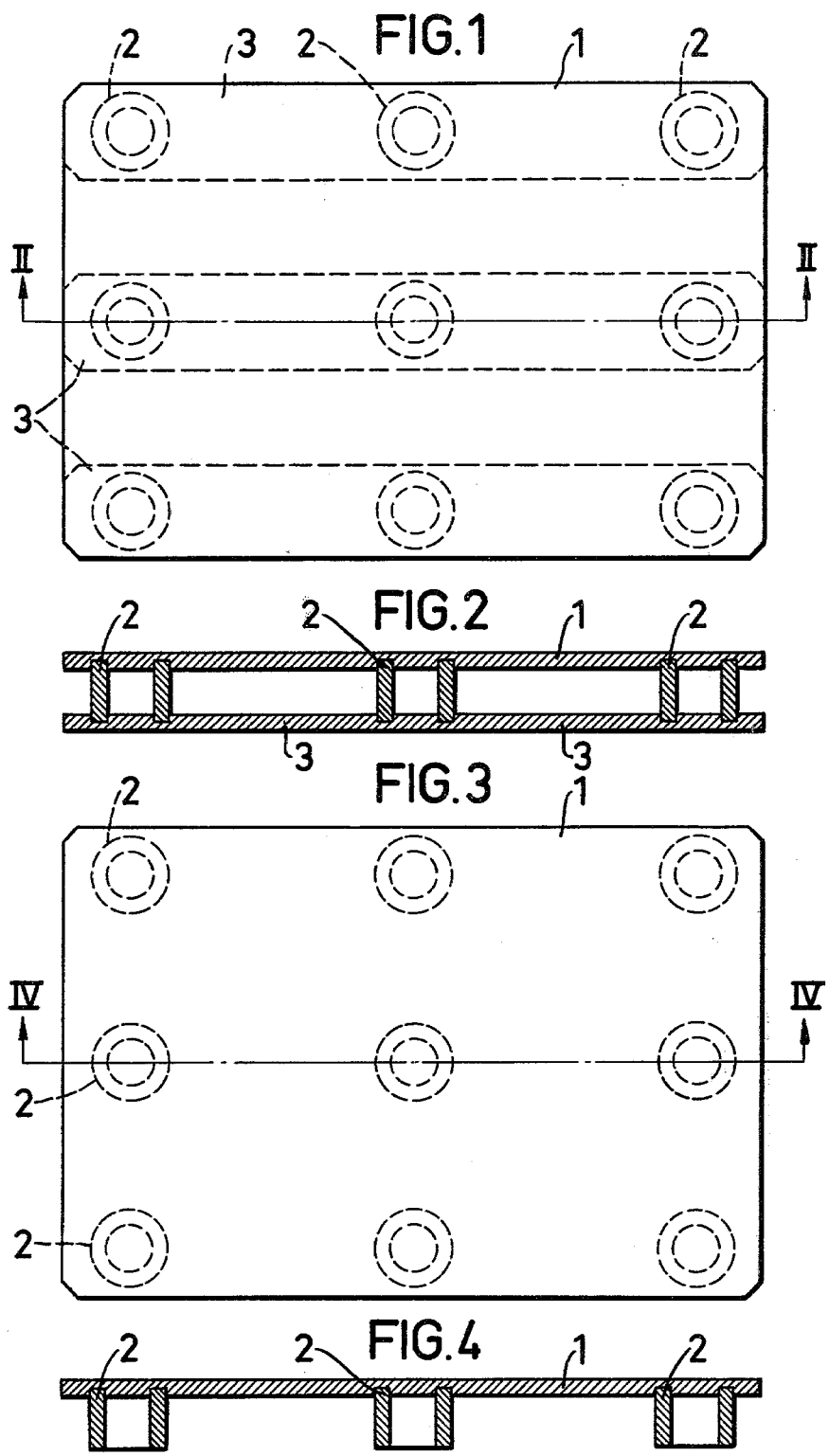

LOADING PALLET

This is a continuation of application Ser. No. 773,154, filed Mar. 1, 1977.

This invention relates to a loading pallet of the kind used for the transport of bulky objects to protect the same and to render it possible to handle the objects, for example, by fork trucks or the like. Conventional pallets of this kind are in Europe standardized and denominated by the term Europe-pallet (in Sweden also called SJ-pallet). These pallets are manufactured solidly of wood and normally the sender requests them be returned. The pallets are relatively expensive, "splintery" and heavy and, therefore, tedious to handle. A substantial disadvantage of these pallets, furthermore, is that they scarcely can be repaired when damaged and that for re-using the wood the nails must be removed, which is quite expensive. The amount of "scrap" from these pallets is great.

Owing to the aforesaid inconveniencies, the pallets contribute substantially to the high freight rates, and their manual handling at all transportation of pallets without goods represents the greatest share.

The present invention relates to a loading pallet, which is manufactured of particle board material, glue and tubular pieces of cardboard and does not show the aforesaid disadvantages. It is further, of a lighter weight and cheaper than previous constructions. A further advantage of the pallet according to the invention is that is does not include nails or the like and, therefore, advantageously can be designed as a throw-away packing, which can be collected and returned directly to the manufacturer for being beaten and manufacturing thereof new particle boards or the like. The pallet according to the invention, especially the throw-away pallet, requires from the transport companies a routine different from the traditional one. The throw-away pallets are collected and returned to the supplier of particle boards at suitable time intervals.

The return of the material for the manufacture of new particle boards implies an economic advantage and reduces the total waste amount.

Such "recoverable" pallets are per se previously known, a.o. through the Swedish Laid Out Document No. 356 945, but they have shown other shortcomings, usually lacking strength, which has limited their use considerably.

The great variation of the known art proves clearly the difficulties of developing a throw-away pallet of the present kind. The requirements to be met by such a pallet can be summarized as follows.

1. The pallet must be so cheap to manufacture, that it really can be used as a throw-away pallet.
2. The pallet must be easy and economic to scrap, which means it must be directly beatable to new fibre pulp in an economic way.
3. The pallet must be sufficiently strong to replace conventional standard pallets.

A known pallet (according to the U.S. Pat. No. 2,444,184) should so far have come closest to meeting the aforesaid requirements. It satisfies the conditions under 1. and 2., but has not proved sufficiently strong unless when a material of a relatively expensive quality is used, in which case, however, the requirement under 1. is not met any longer.

Said U.S. pallet, however, is intended to be a throw-away pallet and is provided with a fibre board and cylindric tubular pieces of glued paper or the like.

The Applicant in the present application has carried out tests with pallets of this kind having glued-on tubular pieces and found, that with a desired cheap material a sufficient strength was not obtainable according to the U.S. construction. The glue between the tubular pieces and the board becomes stronger than the fibre boards and cardboard tubular pieces per se, so that the tubular pieces break loose relatively easily because of the loosening surface layer.

The tested pallet with tubular pieces glued on the surface according to the U.S. patent, thus, did not show sufficient strength to compete with the available wood pallets.

The application subject matter, however, is provided in the deck with recesses for the tubular pieces. Such recesses are per se known in the form of grooves according to the U.S. Pat. No. 2,836,384, but the known grooves are very shallow. It was found that with a greater depth of the recesses the strength increases just above the limit being the minimum requirement on a pallet. In this field even a moderate gain in strength constitutes an essential progress.

Tests recently carried out proved that this increase of the surface of the glue joint really is of decisive importance for the strength of the pallet, particularly when the depth of the recess exceeds half the thickness of the particle board.

Three embodiments of the invention are described below in greater detail, with reference to the accompanying drawing, in which FIG. 1 is a view from above of a pallet according to the invention.

FIG. 2 is a section through the pallet according to FIG. 1 along the line II—II.

FIG. 3 is a view from above of a modified embodiment, intended particularly for goods of lighter weight.

FIG. 4 is a section through the same pallet along IV—IV in FIG. 3.

The embodiment shown in FIG. 1 comprise a particle board 1 of preferably about 1 cm thickness and preferably complying with standardized measures, i.e. about 120×80 cm. In this particle board three rows of three circular holes each, i.e. 9 holes, preferably with an outer diameter of about 12 cm and an inner diameter of 10 cm are symmetrically arranged. Into said holes cylindric card-board tubular pieces 2, preferably with a wall thickness of about 1 cm, are pressed and secured by glueing. It has proved economic to utilize here such cardboard tubular pieces as they are used in great numbers as winding axles for a height of about 12 cm. These tubular pieces are inserted in grooves in the board whereby also the rigidity of the board has proved to be increased substantially compared with the glueing of the tubular pieces 2 directly against the lower surface. The tubular pieces are hereby also fastened in a much more stable manner.

It was found suitable, as already mentioned, to use a particle board with about 1 cm thickness of a quality, which commercially is denominated Class 2. The wet resistance of the board and its strength are increased when it is coated with a layer of, for example, plastic varnish or the like. A pallet with the measures and dimensions stated above has a weight of about 8 kg, which is to be compared in handling with the conventional Europe-pallet having a weight of about 25 kg. For heavy goods, the conventional wood pallet has higher strength values, but in the majority of cases its strength is excessive. The pallet according to the invention can advantageously be used at the majority of transports of, for example, refrigerators, electric ranges and other piece goods. The pallet shown in FIGS. 3 and 4 is particularly suitable for the transport of bundled corrugated cardboard boxes where the load on a pallet seldom exceeds 400 kg.

FIGS. 1 and 2 show an embodiment where three strips 3 of particle board are used to reinforce the lower surface of the pallet. These strips 3 at the embodiment shown have a width of about 12 cm and are provided with annular grooves for the free ends of the cardboard tubular pieces. They are fixed by glueing in the same manner as at the upper particle board 1 and made of the same material as said board. A pallet according to the invention reinforced in this manner has a weight of about 15 kg, but its strength for possible stresses is very close to that of the conventional wood pallet. Contrary to the conventional pallet, the pallet according to the invention can be subjected to substantial damages without causing splinters to project with nails, which in many cases directly endanger the person handling the pallets. From an industrial safety aspect, therefore, the pallet according to the invention is far superior.

Figure 5:
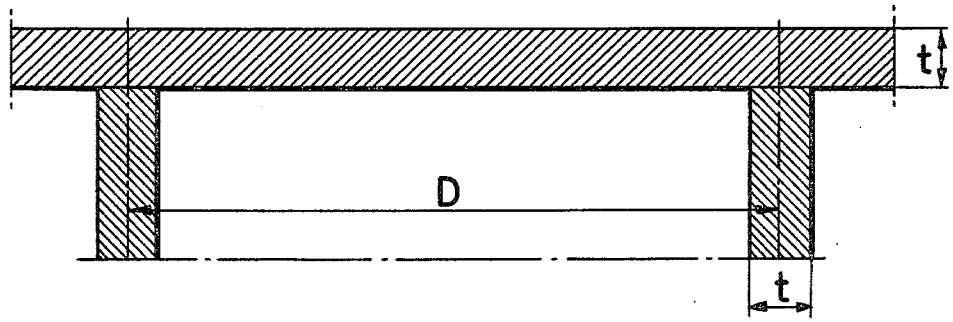
FIGS. 5–7 are sections through different mountings of tubular pieces at the deck of the pallet.

FIG. 5 is a section through the fastening of a tubular piece on the deck according, for example, to the U.S. Pat. No. 2,444,184. The mean diameter of the block member is designated by D, and the material thickness of the deck as well as of the cardboard tube (tubular piece) is designated by t.

It is easily understood that the surface of the glue joint in this case is approx. $\pi \cdot D \cdot t$, and tests at practical use have shown that this fastening, certainly, is sufficient in a great number of cases, but that too great a percentage of tubular pieces loosen. This has happened, in any case, with the material used by the Applicant.

As the ruptures take place about the glue joint due to the loosening of the surface on the deck and follow the glue joint and the tubular piece, one can assume that the jointing is too weak.

Figure 6:
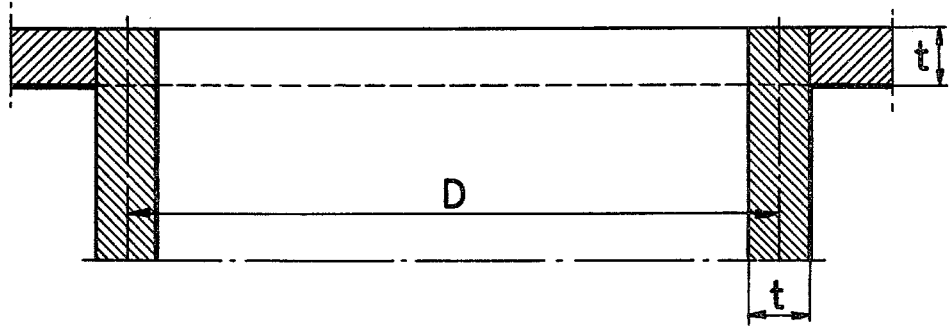

FIG. 6 shows the fastening of a tubular piece extending completely through the deck, which is a variant of the partially through tubular piece positioned in a hole as shown in the FR PS 2 261 192. The surface of the glue joint here has the definition $$(D + \frac{t}{2}) \cdot \pi \cdot t = D \cdot \pi \cdot t + \frac{\pi t^2}{2}$$

The relatively moderate increase $\pi t^2/2$ in combination with the forces arising at the insertion of the tubular piece end (which also increases substantially the resistance to breaking) have shown in practice to increase the strength by about 40%.

Figure 7:
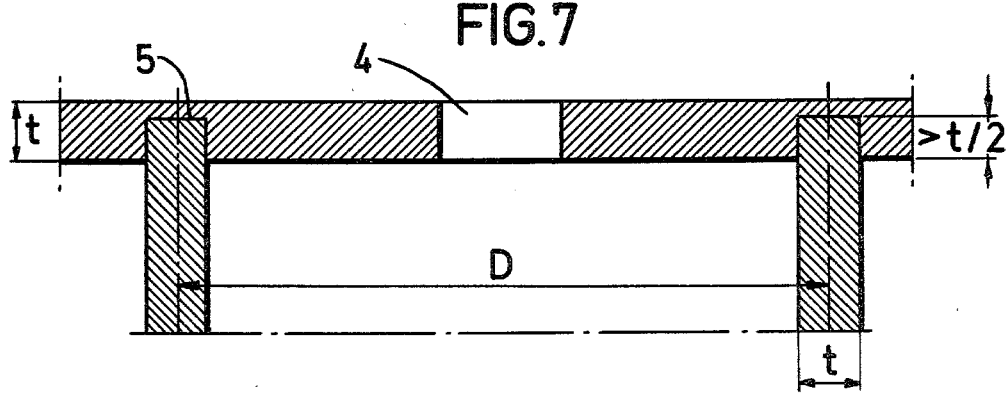

FIG. 7 shows the fastening at Applicant's throwaway pallet according to the invention where the upper edge of the tubular piece is inserted in a circular groove in the board (deck), and where the depth of the groove is greater than half the thickness of the deck, i.e. it is greater than t/2.

The surface of the glue joint in this case is approx. equal to $D \cdot \pi \cdot t + 2 \cdot D \cdot (t/2) \cdot \pi = 2 \cdot D \cdot \pi \cdot t$ i.e. twice as great as is the case according to FIG. 5. It also was found in practice that this type has substantially twice the strength of the US type, and that from an application point of view it is fully comparable with and in many cases superior to the conventional wood pallet. This applies particularly to the pallet having both the deck and the reinforcing strips fastened on the tubular piece in this way (FIGS. 1 and 2).

The fastening of the tubular pieces, thus, decides whether or not the pallet is applicable in practice. The embodiment according to FIG. 7 is the only one which has proved to meet the requirements. In addition to the greater strength, the embodiment according to FIG. 7 also shows the technical effect that no glue penetrates out to the upper surface of the deck and adheres to the hardening table, thereby facilitating the manufacture and rendering it cheaper. According to the invention it was found suitable to provide a hole, which in the drawing (FIG. 7) is designated by 4 and which partly serves as a centrum guide for the cutter milling the groove 5 in FIG. 7 and partly serves for removing glue vapour, condensate and the like formed within the tubular piece.

At the embodiment according to the invention, thus, the fastening groove is provided in the form of a milled circular groove of uniform width in the board, and the depth of the groove exceeds half the thickness of the board. In this groove, at one or both ends of the tubular piece, a binding agent (glue) is applied, whereafter the end of the cardboard tube is inserted in the groove and the glue is hardened.

The pallet manufactured in this way has proved by far superior to the conventional constructions with respect to strength. This is particularly true when both the deck and the underlying strips are attached to the tubular pieces in this way.

An additional technical effect has been obtained according to the invention through the protection against glue leakage in the direction to the hardening table, whereby it has become possible to increase the production rate although the milling of a groove in principle is a more complicated operation than the previous punching of through holes.

The advantages of the pallet according to the invention, thus, are lighter weight, lower price and safer handling. The pallet, moreover, is made of a material, which directly can be beaten for recovering the fibre material. The absolute freeness from nails, splinters and the like is in the connection an advantage of special importance. The pallet, furthermore, makes large amounts of valuable wood available for other purposes. It can be mentioned that the number of scrapped pallets of conventional type in one large company can amount to above 100 000 per year.

What I claim is:

1. A throw-away loading pallet made from fiber board and having cardboard tubular supports serving as feet comprising
    a flat fiber board deck,
    a plurality of rows of blind annular milled recesses formed in the underside of said deck, the depth of the recesses exceeding one-half the deck thickness,
    a fiber board reinforcing strip for each said row of recesses in alignment therewith,
    an annular milled recess formed in the top side of said strips opposite each of said recesses in the deck and having like dimensions to said deck recesses,
    a plurality of tubular posts open at each end and made of cardboard, one end of said posts being pressed into a recess in the deck and the other open end being pressed into the opposing recess in the reinforcing strip to the full depths of said annular recesses such that said deck and strip contact both the outer and inner surfaces of said tubular posts at their respective ends over a length exceeding said one-half thickness, and the ends of said posts contact the surface in the bottom of said recesses, and all said contact surfaces between said posts and the receiving recesses in the deck and reinforcing strips being glued.

2. The pallet of claim 1 which has vent holes through the deck concentric with said blind annular recesses and connecting with the interior of the tubular posts.

* * * * *